(12) United States Patent
Spartz (10) Patent No.: US 11,187,585 B2
(45) Date of Patent: Nov. 30, 2021

(54) FTIR SPECTROMETER WITH OPTICAL FILTER FOR LOW LEVEL GAS DETECTION SUCH AS FORMALDEHYDE AND ETHYLENE OXIDE

(71) Applicant: MLS ACQ, Inc., East Windsor, CT (US)

(72) Inventor: Martin L. Spartz, Ellington, CT (US)

(73) Assignee: MLS ACQ, INC., East Windsor, CT (US)

( * ) Notice: Subject to any disclaimer, the term of this patent is extended or adjusted under 35 U.S.C. 154(b) by 58 days.

(21) Appl. No.: 16/653,689

(22) Filed: Oct. 15, 2019

(65) Prior Publication Data

US 2020/0116569 A1  Apr. 16, 2020

Related U.S. Application Data

(60) Provisional application No. 62/744,715, filed on Oct. 12, 2018, provisional application No. 62/744,719, filed on Oct. 12, 2018.

(51) Int. Cl.
| | |
|---|---|
| *G01J 3/45* | (2006.01) |
| *G01N 21/3504* | (2014.01) |
| *G01J 3/28* | (2006.01) |
| *G01J 3/12* | (2006.01) |
| *G01J 3/453* | (2006.01) |
| *G01N 21/35* | (2014.01) |

(52) U.S. Cl.
CPC . *G01J 3/45* (2013.01); *G01J 3/28* (2013.01); *G01N 21/3504* (2013.01); *G01J 2003/1213* (2013.01); *G01J 2003/2869* (2013.01); *G01J 2003/4534* (2013.01); *G01N 2021/3595* (2013.01)

(58) Field of Classification Search
None
See application file for complete search history.

(56) References Cited

U.S. PATENT DOCUMENTS

| | | | |
|---|---|---|---|
| 2010/0079764 A1* | 4/2010 | Spartz | G01N 21/031 356/451 |
| 2015/0260695 A1* | 9/2015 | Spartz | G01N 30/8606 250/339.01 |
| 2016/0245742 A1* | 8/2016 | Case | G01N 33/22 |

OTHER PUBLICATIONS

Zemek, P.G., et al., "FTIR Instrumentation for Single Digit ppb Detection Limits of Formaldehyde and other target compounds in Combustion Sources and Natural Gas Fired Turbines," PowerPoint presentation at International Forum for Process Analytical Chemistry & Technology (IFPAC), Jan. 24, 2003.
Zemek, P.G., et al., "Source Sampling and Analysis For Air Pollutants," (Source Evaluation Society) XXVIII, PowerPoint presentation on Jan. 13, 2004 and Mar. 10, 2004.

* cited by examiner

*Primary Examiner* — Yara B Green
(74) *Attorney, Agent, or Firm* — HoustonHogle LLP (57) ABSTRACT

A gas analysis system with an FTIR spectrometer preferably utilizes a long path gas cell, a narrow band detector, and an optical filter that narrows the detection region. The interferograms are further prevent baseline drift and analyze the resultant spectra.

21 Claims, 5 Drawing Sheets

FTIR SPECTROMETER WITH OPTICAL FILTER FOR LOW LEVEL GAS DETECTION SUCH AS FORMALDEHYDE AND ETHYLENE OXIDE

RELATED APPLICATIONS

This application claims the benefit under 35 USC 119(e) of U.S. Provisional Application No. 62/744,715, filed on Oct. 12, 2018, and U.S. Provisional Application No. 62/744,719, filed on Oct. 12, 2018, both of which are incorporated herein by reference in their entirety.

BACKGROUND OF THE INVENTION

Fourier transform infrared (FTIR) spectrometers with state-of-art Sigma Delta (digitizers) converters can in some cases provide full digitization of the FTIR signal down to the base detector noise level. Nevertheless, such spectrometers are often limited by factors other than detector noise or the detectors operating in a non-linear range. Instead, their signal to noise ratios (SNR) are not fully optimized.

This lack of optimization especially becomes a problem when high sensitivity is required. FTIR gas analyzers generally are not capable of measuring compounds down single digit parts per billion (ppb) levels unless very long pathlength gas cells are incorporated. If very long path gas cells are utilized, significant sample volumes are required to sweep the gas cell, and QA/QC measurements become more difficult to pass.

Laser based spectrometry systems can provide this capability, but they may not be able to separate all the compounds present if they are scanning over a very narrow spectral range. Also, laser systems are sometimes limited by source noise instead of detector noise.

State-of-the-art photoacoustic infrared systems have demonstrated very low-level detection, but they must be run in a batch type mode where the sample is drawn into the cell and then measured, so that pressure oscillations are not observed by the detector. These systems can also suffer from compounds condensing on the microphone and most are not able to run at high temperatures at which emissions gases are normally analyzed.

SUMMARY OF THE INVENTION

Fourier transform infrared (FTIR) spectrometers are normally "detector noise" limited when properly configured. This means that the detector noise is the largest noise source in the instrument. Ideally, the detector noise is greater than the noise from the electronics, infrared (IR) source and other sources.

When the detector is the limiting noise source, as the light intensity increases on the detector, the SNR increases linearly (if a linear detector). In the visible range, the detectors are in many cases "Shot Noise" limited. This means that as the light increases on the detector, the noise also increases with that added intensity, so there is less advantage to additional light intensity or multiplexing many wavelengths.

FTIRs can also have an analogous issue in that as more light strikes certain detectors, they become non-linear in response. Additional light then does not provide a linear increase in the signal to noise ratio (SNR) or reduction in detection limit. Moreover, if the non-linearity response is not corrected, the resultant absorbance spectrum will have a smaller and varying absorbance based on the light intensity.

Most FTIR gas analyzers sold today, utilizing HgCdTe (MCT) detectors are not detector noise limited and also are operating in a non-linear detector range. So, increasing the light intensity after a point does not produce any enhancements to the SNR or reduction in the detection limits. Utilizing then a detector with significantly higher sensitivity (like a narrow band 5-μm detector) will generally provide little to no SNR improvement since its noise is 10 times lower than that of a standard detector and the system noise is dominated by some other source.

InSb and InGaAs detectors are known to be more linear and could be utilized to get a more linear signal but again if they are not the limiting noise source then the lowest SNR is not achievable.

A simple way to determine if an instrument is electronics noise limited is to turn up the detector preamp gain on a low signal to see if the SNR improves. If it does, the instrument is not detector noise limited. Increasing the preamp gain increases the detector noise and signal equally, so no enhancement should be noticed if the detector noise is the limiting noise.

One other common issue with FTIR systems is that they can produce double modulation features from light passing through the interferometer more than once. These features can act like additional noise within the sample spectrum, limiting the potential detection limits. Water is commonly present in most samples analyzed by FTIR gas analyzers and its double modulation features appear in the formaldehyde/ethylene oxide measurement region. This limits the ability of the FTIR to measure very low-levels of these two compounds.

In general, according to one aspect, the invention features a gas analysis system with an FTIR spectrometer, a long path gas cell, a narrow band detector, an optical filter that narrows the detection region further and then processing software to prevent baseline drift and analyze the resultant spectra.

In general, according to one aspect, the invention features a Fourier transform infrared spectrometry system, comprising a source for generating light, an interferometer for receiving the light, a sample cell containing a gas sample, a narrowband detector for detecting the light after passing through the sample gas, and a bandpass filter for filtering light prior to being detected the detector. The interferometer provides resolution within a bandpass of the bandpass filter.

Preferably, wherein the detector is a MCT detector with possibly at least an 8 μm cutoff or even a 5 μm cutoff.

Often, the optical filter has a bandpass of less than 450 cm$^{-1}$ and it usually less than 300 cm$^{-1}$.

In order to improve performance, a peak detectivity "D*" of the detector is higher than $1 \times 10^{10}$.

Preferably, the system further comprises a controller detecting an output of the detector as the interferometer is scanned and processing interferograms within the bandpass of the bandpass filter at two resolutions and using the interferograms processed at a lower resolution as a background for interferograms processed at a higher resolution.

In addition, the controller can employ cosine apodization and also possibly adding a filter spectrum of the filter into a regression analysis.

In general, according to one aspect, the invention features a spectrometry method, comprising analyzing a gas sample with a Fourier transform infrared spectrometer, detecting the light after passing through the sample gas, and filtering light prior to being detected the detector.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present system allows for noise levels consistent with single digit, parts per billion (ppb) detection of gases with a direct reading FTIR. It preferably involves both a hardware and spectra data processing and analysis. It has been demonstrated to yield a significant reduction of noise and detection limits for formaldehyde and ethylene oxide. Nevertheless, the present approach would also work for other compounds as well, especially those compounds that absorb IR light in the 1 to 5 µm spectral region.

The system uses a narrow band HgCdTe (MCT) that has much higher Detectivity "D*" than standard MCT detectors. D* is the photo sensitivity per unit active area of the detector. In the current embodiment, peak detectivity "D*" of the detector is preferably higher than $1 \times 10^{10}$. Preferably, it is about $1 \times 10^{11}$. This higher D* provides the framework to obtain much higher signal-to-noise spectral data and produce much lower detection limits for compounds with spectral features in the 1 to 5 µm spectral region. However, utilizing just this modification to the FTIR gas analyzer will not generate the required improvements due to limitations in the electronics and linearity of the detector.

Narrow band MCT detectors are very sensitive but tend to be very non-linear in response. However, if the light reaching the detector is limited to just the spectral areas of interest, these detectors can be significantly more linear in response. During initial testing of the prototype the signal rose from about 2.5 V to ~13 V by limiting the spectral pass band reaching the detector. This by itself is more than a 5-fold improvement in SNR due to a more linear response.

The present system thus uses an optical bandpass filter to limit the light striking the detector and uses an FTIR to provide the resolution necessary to predict the compound in the presence of other compounds like water, $CO_2$ and hydrocarbons.

In the cases of formaldehyde and ethylene oxide, they are both narrow absorbers with visible fine structure, so an interferogram processing mode known as AutoRef can be incorporated to assure the lowest possible detection limit.

Figure 1:
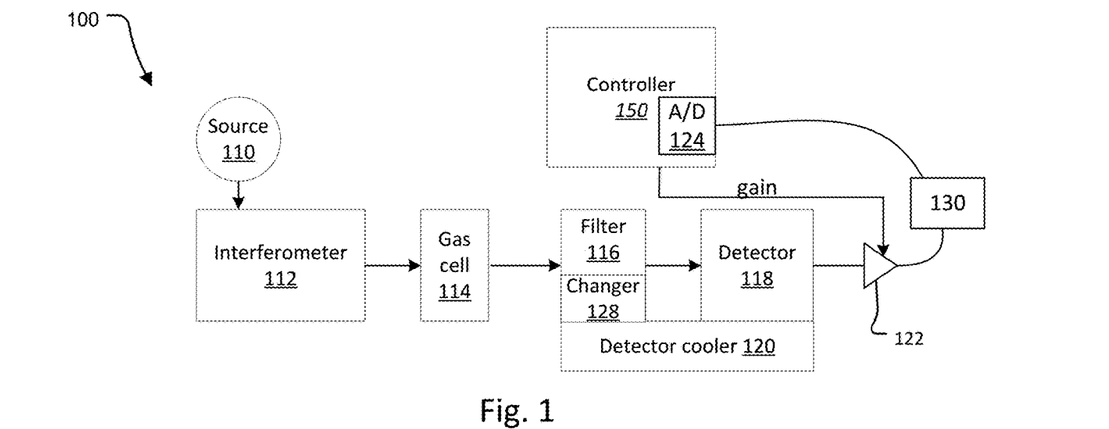
FIG. 1 is a block diagram of an Fourier transform interferometer (FTIR) spectrometer configured according to the principles of the present invention.

FIG. 1 shows an exemplary FTIR spectrometer 100.

Light is generated by a source 110. Common sources are heated silicon carbide elements, tungsten-halogen lamps and other thermal sources.

The light is coupled into an interferometer 112, such as a Michelson interferometer including a mirror scanned under the control of the controller 150.

The light from the interferometer 112 passes through a gas cell 114 containing the sample. Currently, the cell 114 is a multiple pass gas cell, but a single pass gas cell could be used.

The light is then detected by a detector 118. To get the best SNR, a 4 or 5-µm cutoff MCT detector 118 with very high D* sensitivity is utilized. Specifically, the detector 118 only measures light having a wavelength of less than 8 µm, and preferably less than 5 µm. Due to this narrow detector bandpass only gases that absorb, i.e., have characteristic absorption features, in the 1 to 4 or 5 μm region can be measured. This limits the number of compounds, but many still can be measured at low levels like Hydrocarbons (aliphatics and aromatics), water, $CO_2$, CO, NO, HCN, HCl and HF.

An optical filter 116 with a passband of less than 450 $cm^{-1}$ bandpass filters the light received by the detector 118. Typically the passband is smaller such as less than 300 $cm^{-1}$, and its passband is sometimes about 150 $cm^{-1}$ Preferably, the filter 116 is placed in front of the detector 118. Typically, the center wavelength of the filter's passband is between 3 and 4 μm.

It should be noted that the filter 116, can be placed anywhere and are generally positioned near a focal point but could be in a collimated beam as well. The filter 116 used one implementation has a 25 millimeter (mm) diameter or clear aperture and is a few millimeters thick.

Since most of the light is now blocked by the filter 116, the gain of a preamplifier 122 of the detector 118 can be increased to improve the SNR even further. This gain adjustment only helps if the system 100 is not already detector noise limited. If the system 100 is electronics noise limited, the gain should be increased until the detector noise is twice that of the electronics or more, to get the best SNR.

Then since formaldehyde and ethylene oxide and other similar species of interest are narrow absorbers, the FTIR 100 is preferably operated in the AutoRef mode. In this mode, the FTIR controller 150 uses the collected spectra as a self-reference. Specifically, the spectra are collected at higher resolution (0.5, 1.0 or 2.0 $cm^{-1}$) and these interferograms (igrams) are processed two ways. First, at the resolution the igrams were collected, then second, at some reduced resolution 2, 4 or 8 times lower. By processing the igram two ways, the controller 150 generates a background spectrum for each sample spectrum. The high-resolution single beam is then the sample spectrum and the lower resolution single beam is the background spectrum. The resultant absorbance spectrum is the difference between those two resolutions. This ensures that the baseline does not drift because each sample spectrum is its own background spectrum.

According a preferred embodiment, the filter 116 is housed within the detector assembly 118. As a result, the detector and optical filter are temperature stabilized such as by the cooler 120 for the detector 118. This approach removes any passband shift due to thermal changes of the filter 116.

Figure 2:
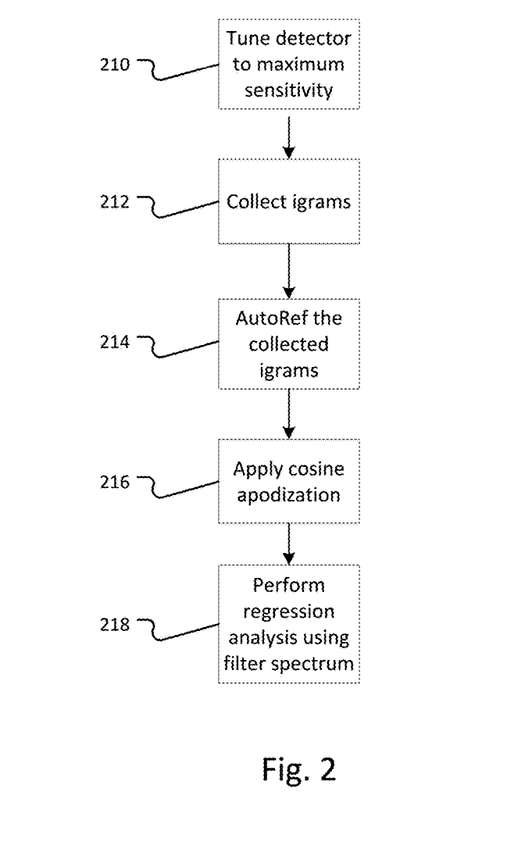
FIG. 2 is a flow diagram the operations performed by the spectrometer controller 150, according to the invention.

FIG. 2 shows the operations performed by the controller 150.

In a first configuration step, the controller tunes the detector 118 for maximum sensitivity in step 210 by controlling the gain setting for the pre-amplifier 122.

Then the igrams are collected in step 212 by the controller 150 scanning the interferometer 112.

The igrams are then processed in an AutoRef mode in step 214. In fact, 2×8 $cm^{-1}$ AutoRef processing has been found to be an ideal mode for both formaldehyde and ethylene oxide detection. In more detail, the collected igrams are processed at the collected higher resolution, such as 0.5, 1.0 or 2.0 $cm^{-1}$). These same igrams are then processed at a reduced resolution that is 2, 4 or 8 times lower, such as 8 $cm^{-1}$. The igrams processed at the lower resolution are then used as a background for the high resolution spectrum. In more detail, the igrams are processed to two spectral domains (spectra), a high resolution and a low resolution. Those are then ratioed to get absorbance. Absorbance=$\log_{10}(I_{=0}/I)$, where $I_0$ is the low resolution background I is the high resolution sample.

Lastly, an apodization function is applied in step 218. Preferably, the apodization function goes to zero at the extent of the function was chosen to reduce additional artifacts from developing in the interferogram processing. A cosine function is an apodization that starts at 1 and goes to zero at the extent of applied interferogram. This will generally remove any additional oscillations caused by the discontinuity in the igram and the fact that the igram is being processed at high and low resolution.

As mentioned above, the preferred system 100 contains the narrow band detector 118, optical filter 116, and a maximized gain setting applied to the detector 118 by the controller 150, or possibly the user, setting for the preamplifier. The collected raw igrams from this system are then processed at two resolutions to produce the highest SNR data with no baseline drift. The AutoRef processing is then incorporated to analyze the computed spectra.

The optical filter 116 adds its own spectral features to the calculated spectrum, since it is processed with two resolutions. These features should be captured and added to the analysis to prevent them from negatively affecting the measurements These features (or "filter spectrum") can be easily captured by passing $N_2$ or other non-absorbing IR gas through the gas cell. The filter spectrum is then added to the analysis, so that these features are removed in the analysis. When this is done properly any calculated residual spectra could be up to 10 times smaller than data processed without this spectrum.

Thus, preferably, the filter spectra is used in the regression analysis 218. This helps to reduced noise in the residual and prevent quantitative biases from occurring. The spectral features from the optical filter show up in the spectrum for two reasons: 1) use of the AutoRef function, so there are filter spectral differences between the two resolutions; and 2) the optical filter is made with thin high refractive index films and these can cause oscillations in the computed spectra.

By developing this optimized FTIR gas analyzer invention, it provides a platform to offer numerous optical windows that can be optimized for certain compounds. One current system would be good for formaldehyde, acetaldehyde, acrolein, HCl and a few other compounds.

By changing the filter, the system could be excellent for aromatic or aliphatic hydrocarbons, HCN, $H_2S$, ethylene oxide (ETO) or HF. The filter can be changed manually by replacing a mounted optical filter with another optical filter.

An additional embodiment that would add significant flexibility and value to the user is to allow the system to operate in multiple configurations. In more detail, a filter changer 128 is added that allows the controller 150 to switch the filter 116 out of the beam path. Thus, this configuration would allow the user to measure compounds over the entire detector band pass range of 1-5 μm. Specifically, the filter changer 128, such as a filter wheel, includes multiple optical filters to place into the beam path along with an open slot for an "air" filter. In addition, a second preamp or adjustable preamp that can be selected when a single gas is needed at very low levels. That way the user can use it as a broad-based analyzer or a narrow based analyzer and the appropriate electronics configurations are applied by the controller with each optical configuration.

In general, the present system can be used for different applications. These modifications to the FTIR could be used by any compound that absorbs in the 1-5 μm (10,000-2,000 $cm^{-1}$) region. It is possible that other detectors could be utilized in other regions but the reason this works is that the detector is not currently the limiting noise source and that the detector noise in this case is significantly less than the electronic noise.

Detailed Analysis:

In the preferred system, by using a narrow bandpass optical filter 116, there is a significant reduction in the light intensity striking the detector 118, which can allow for a linear or near linear detector response. Then, by switching from a standard 16-μm detector to a 5-μm cutoff detector and adding the optical filter, the reported signal at 2,800 cm$^{-1}$ increased by about 4 times with no change in amplification. This suggests that at a minimum 4 times better SNR can be obtained. Second, by limiting the wavelengths reaching the detector 118, the gain on the amplifier 122 can be increased significantly to fill the range of the analog to digital converter 124 of the controller 150, such that the detector noise becomes the dominant noise source, which generates an additional improvement in SNR.

Figure 3A:
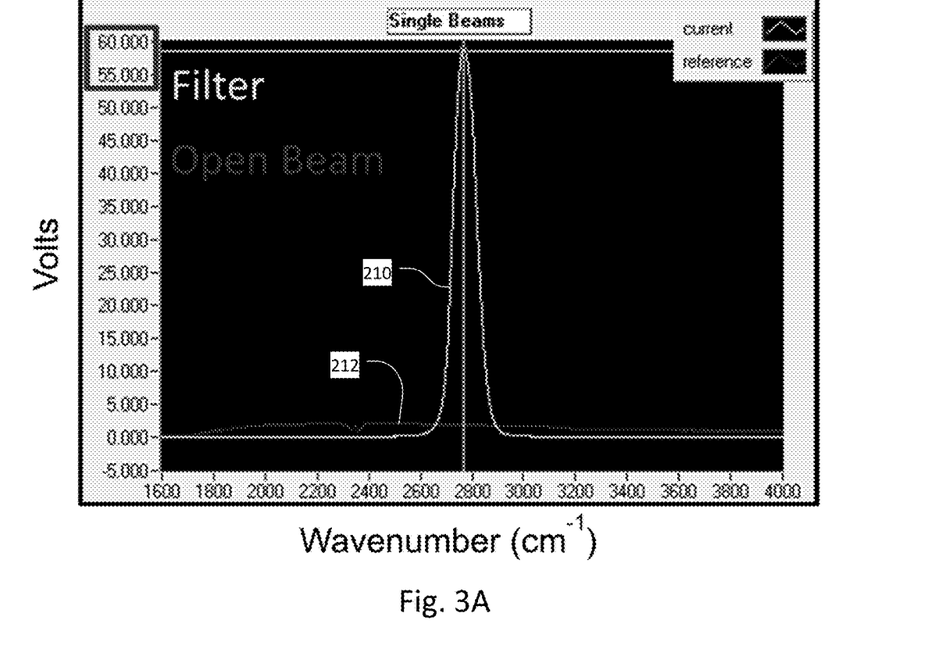
FIGS. 3A and 3B are spectral data showing signal, measured in Volts, as a function spectrum, measured in wavenumber for an optimized FTIR spectrometry system according to the present invention (FIG. 3A) with respect to a FTIR (FIG. 3B) with only the added detector filter.
Figure 3B:
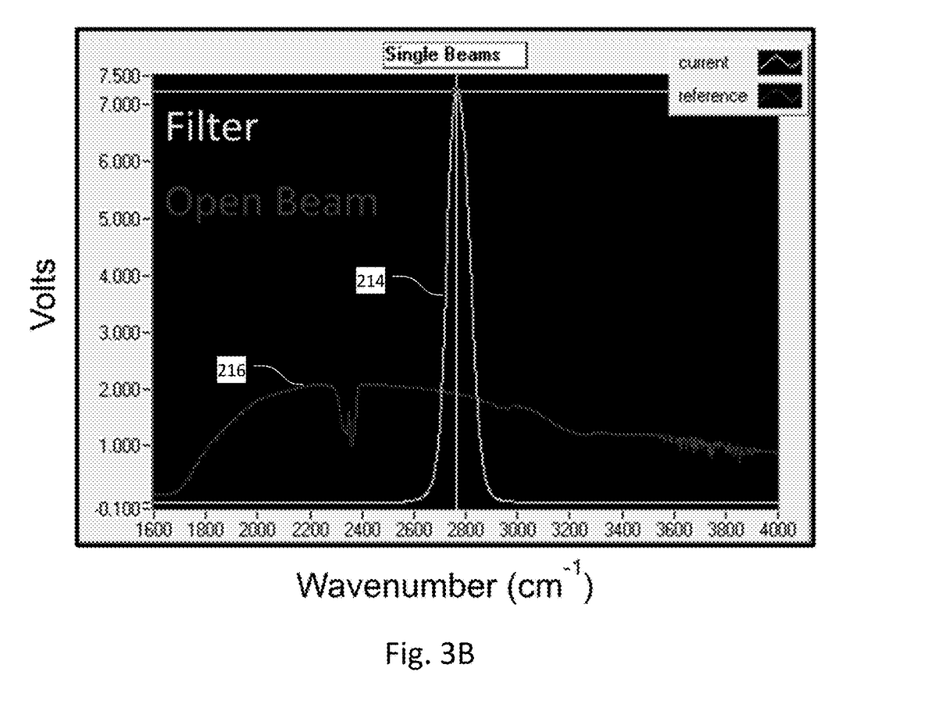

In the fully optimized data below, a peak signal 210 of ~50 V (units) was produced as shown in FIG. 3A with the filter 116 in place against a standard 5 μm detector spectrum 212, without the filter. Normally a single-beam signal 214 is around a few Volts in a standard FTIR gas analyzer with a 16-μm detector with a higher background 216 as shown in FIG. 3B.

Figure 4:
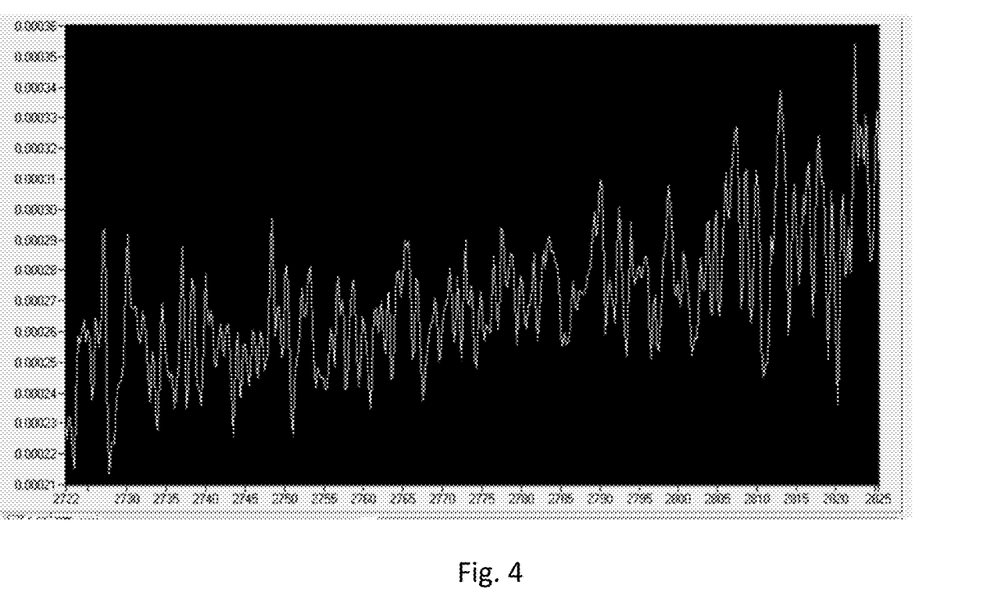
FIG. 4 is a plot of spectral data showing signal, measured in µabs, as a function spectrum, measured in wavenumber for FTIR spectrometry system with a 1-min average absorbance spectrum, in the formaldehyde absorption region.

FIG. 4 shows a 0.5 cm$^{-1}$, cosine apodization, 1-min average absorbance spectrum, in the formaldehyde absorption region. The peak-to-peak noise is about 50 μabs, 10 to 20 times lower than a standard FTIR gas analyzer with a 16 μm detector.

As introduced previously, the detector response is now linear, so no artificial or mathematical detector linearization is required, and the optimum SNR is achieved.

Figure 5:
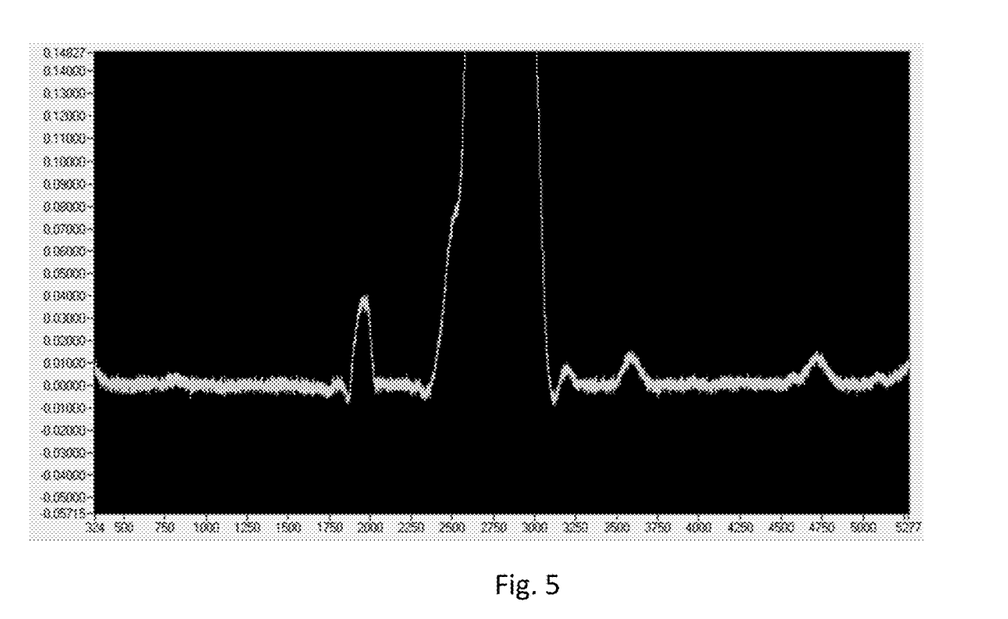
FIG. 5 is a plot of spectral data showing signal, measured in Volts, as a function spectrum, measured in wavenumber for FTIR system for a wider spectral region showing the effect of the filter 116 on detector linearity.

In the single beam spectrum of FIG. 5, outside the filter band pass (2,400-3,000 cm-1) the signal is nearly zero which suggests the detector is operating within a linear or near-linear range. With a signal of 50 units, even a small non-linearity (non-zero baseline) would have little effect on the quantification of the formaldehyde.

In addition, since detector linearization is not needed, the system can be operated AC-coupled, meaning there is no need to measure the DC component of the interferogram. In this mode, a resistor capacitor (RC) filter 130 is added on the electrical path between preamplifier 122 and a digitizer 124 of the controller 150 to reduce the electronics noise and remove the DC component. This allows the largest detector gain to be used to fill the digitizer range with the biggest signal possible. As the light intensity falls or is reduced from absorption, there is no DC signal that can drop and cause the signal to fall off the digitizer range.

Figure 6:
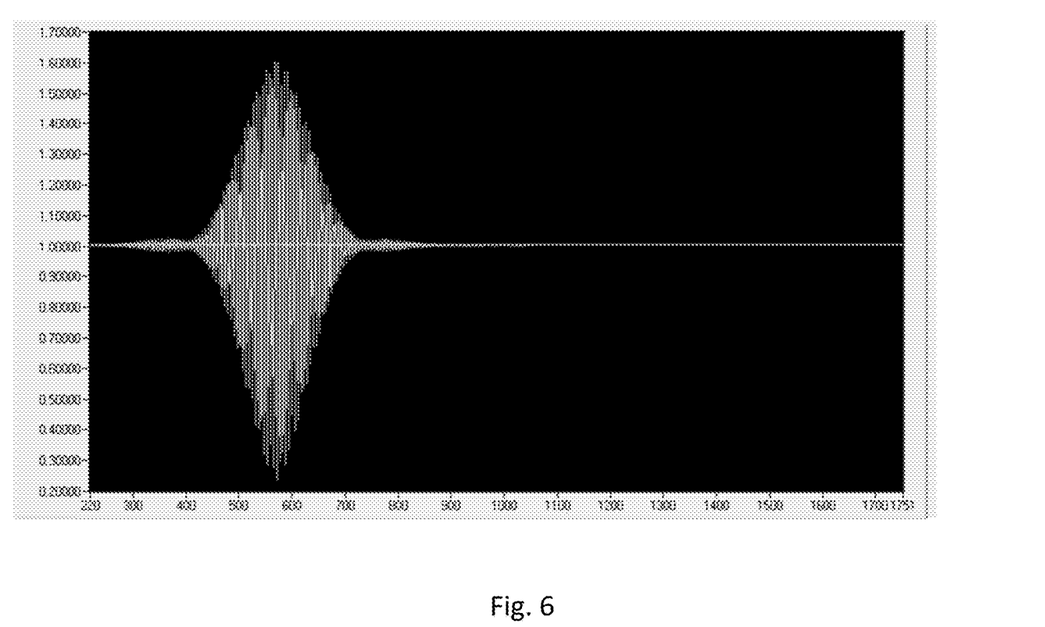
FIG. 6 is an interferogram of the FTIR spectrometry system of the present invention.

With a narrow bandpass filter, an interesting interferogram is generated with lots of structure around the centerburst as shown in FIG. 6. This added structure also requires better interferogram processing algorithms to assure that the data are correctly handled. This interferogram shows the resolution that the interferometer provides resolution within a bandpass of the bandpass filter.

Running the instrument in Mid-IR mode and at 220 kHz with cosine apodization also improved the SNR over the standard Near-IR, 144 kHz and Medium Norton Beer by 20-30%. This suggest that even with all the enhancements, the detector noise is still not the only dominate noise source.

Lastly, and probably the most significant issue for the FTIR gas analyzer utilized, is by using a 5-μm cutoff detector, there is no double modulation appearing at 2700-2900 cm$^{-1}$ (from IR signals in the 1350-1450 cm$^{-1}$ range) where formaldehyde is measured. Commercial FTIR gas analyzers can have 0.005 to 0.007 abs of double modulation that is not reduced by signal averaging. In many cases, this double modulation can raise the formaldehyde detection limit significantly due to the added noise in the spectral residual. It can also cause a large quantitative bias to the data since the features have to be accounted for in the regression algorithm.

Configurations:

For 1 minute of data collection at 0.5 cm$^{-1}$ MNB, a standard FTIR gas analyzer with 16-μm detector has a peak-to-peak noise in the formaldehyde region of 0.0005 to 0.001 abs, assuming no double modulation.

For 1 minute with the optimized setup (0.5 cm$^{-1}$, cosine, 220 kHz, 5 μm detector, narrow band pass filter, and a maximized gain), the peak-to-peak noise is about 0.00002 abs or 20 μAbs, 25 to 50 times lower than a standard FTIR gas analyzer with no double modulation.

There are a couple of potential configurations that this optimized FTIR gas analyzer can be operated for low ppb formaldehyde determinations. Operating at a standard resolution of 0.5 cm$^{-1}$, the SNR is high enough for low level detection, but the baseline drift of the instrument will be orders of magnitude greater than the signal or absorption features to be measured. If the baseline moves 0.01 abs, not uncommon for FTIR gas analyzers deployed for stationary source testing, and the measured signal is 0.00002 abs, the baseline drift is 5,000 times larger than the signal to be measured, which is not optimal. Lower resolutions could be used to further reduce the noise, but the baseline drift would be the same at any resolution. Thus, going to lower resolution here would be of little (no) help, and it would limit the ability to picket fence (remove features) the 10% water spectral features from the turbine engine or from an ethylene oxide measurement.

When, using AutoRef processing, the resultant absorbance spectrum is the difference between those two resolutions. So, sharp features like water show up as "second derivative" type features, where the absorbance spectrum goes down, up, down around any absorption line. This methodology is very good for high resolution features but poor for lower resolution features, since the two spectra are near identical. The real advantage for this application is that each stored and processed Igram is both the sample and the background, so there is no baseline drift. Very small signals like 0.00002 abs can be now measured routinely.

Figure 7:
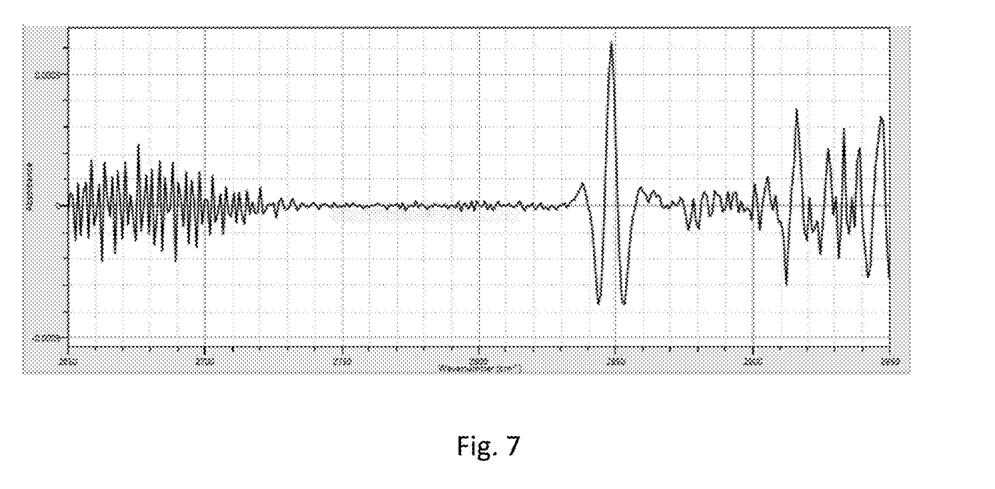
FIG. 7 is a 2 $cm^{-1}$ by 8 $cm^{-1}$ AutoRef absorbance spectrum of $N_2$.

FIG. 7 is a 2 cm$^{-1}$ by 8 cm$^{-1}$ AutoRef absorbance spectrum. Note some of the features on the right and left due to the AutoRef function as well as the large second derivative like peak at 2850 cm$^{-1}$. Also, note that the noise in the middle is equally centered around zero.

Figure 8:
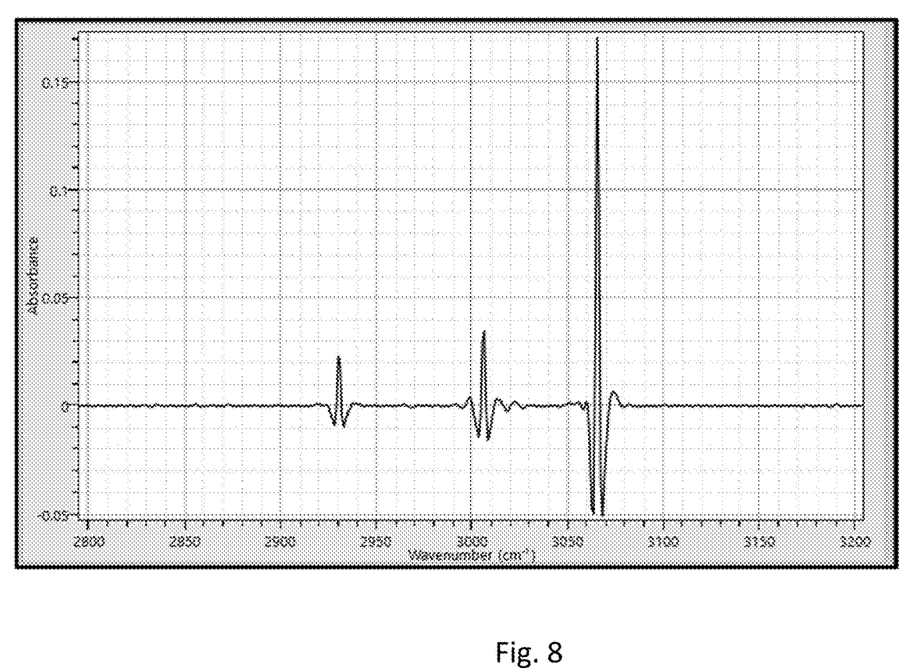
FIG. 8 is a 2×8 $cm^{-1}$ AutoRef spectrum of Ethylene oxide.

FIG. 8 is a 2×8 cm$^{-1}$ AutoRef spectrum of Ethylene oxide, any of these bands can be utilized to measure it or just one.

Figure 9:
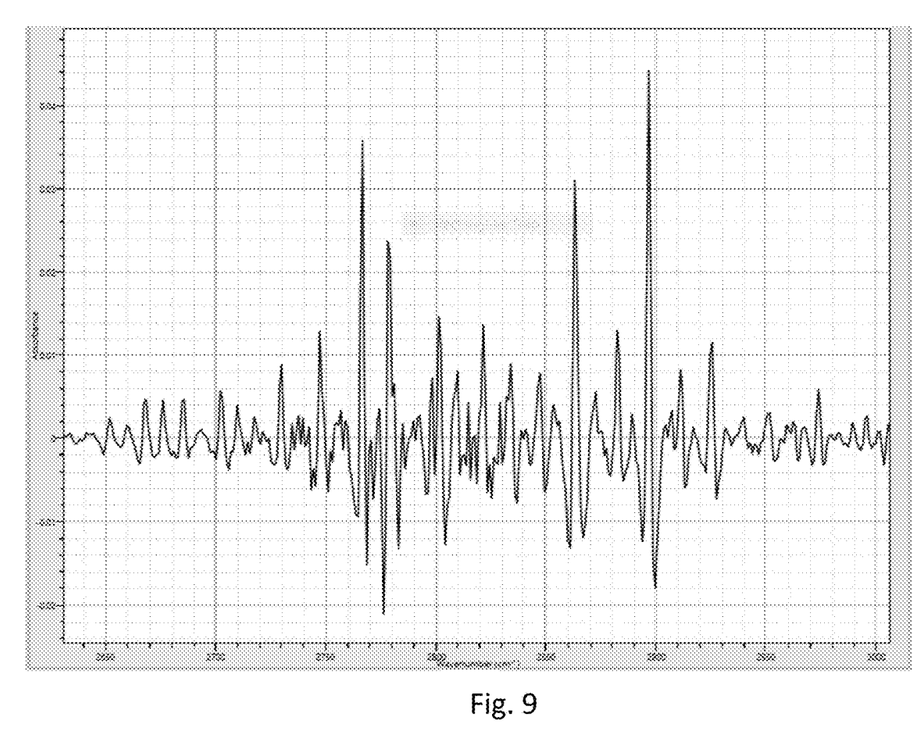
FIG. 9 is 2×8 $cm^{-1}$ AutoRef spectrum of formaldehyde.

FIG. 9 is 2×8 cm$^{-1}$ AutoRef spectrum of formaldehyde. Formaldehyde has many bands that could be utilized for analysis depending on potential interferences. The lower the frequencies used the less likely aliphatic compounds and water present will interfere with its measurement.

Results

To determine a true detection limit for formaldehyde emission from a natural gas fired turbine, three solutions were created to generate 10, 50 and 100 ppb formaldehyde in ~10% water, balance $N_2$. These solutions were vaporized from a controlled syringe pump and added to a constant flow of $N_2$ passed through a calibrated MFC. The $N_2$ and injection port were maintained at 191° C. to guarantee vaporization and prevent condensation.

The data were collected using 2×8 cm$^{-1}$ AutoRef with cosine apodization. The Std Dev for 10 ppb and 100 ppb samples were just below 3 ppb for a 1-minute measurement, which would suggest an ~9 ppb formaldehyde minimum detection limit. The 50 ppb sample had a higher standard deviation, but that was most likely due to variances of sample generation with the syringe pump.

All the formaldehyde reported concentrations were well within the 70-130% recoveries needed to pass the QA/QC of USEPA Method 320 or ASTM D6348 spike recovery test, even at the 10 ppb level.

| MultiGas - Formaldehyde Configuration | | | | | | |
|---|---|---|---|---|---|---|
| Scan # | Expected H$_2$O (%) | Measured H$_2$O (%) | Expected HCHO (ppb) | Ave Measured HCHO (ppb) | HCHO Standard Deviation (ppb) | HCHO % Deviation | HCHO % Expected |
| 196-227 | 10.00 | 9.27 | 100.00 | 104.24 | 2.87 | 2.75% | 104.24% |
| 145-176 | 10.00 | 9.31 | 50.00 | 45.60 | 4.20 | 9.21% | 91.20% |
| 95-118 | 10.00 | 9.30 | 10.00 | 8.37 | 2.77 | 33.09% | 83.70% |

Signal Averaging - 1.0 minute

For a standard 60-minute compliance test, the 1-minute averaged data could be further averaged to produce 15 4-minute data points. This would reduce the MDLs by another factor of 2 and get the MDLs in the 4 to 5 ppb range or nearly 20 times lower than the emission limit of 91 ppb for the natural gas fired turbines.

While this invention has been particularly shown and described with references to preferred embodiments thereof, it will be understood by those skilled in the art that various changes in form and details may be made therein without departing from the scope of the invention.

What is claimed is:

1. A Fourier transform infrared spectrometry system, comprising:
    a source for generating light;
    an interferometer for receiving the light;
    a sample cell containing a gas sample;
    a narrowband detector for detecting the light after passing through the sample gas, wherein the narrowband detector has at least an 8 µm cutoff;
    an optical bandpass filter for filtering light prior to being detected by the narrowband detector, with the interferometer providing resolution within a bandpass of the optical bandpass filter, wherein the optical bandpass filter has a bandpass of less than 450 cm$^{-1}$; and
    a controller detecting an output of the narrowband detector as the interferometer is scanned to obtain interferograms.

2. The system of claim 1, wherein the narrowband detector is a MCT detector.

3. The system of claim 1, wherein the narrowband detector has at least a 5 µm cutoff.

4. The system of claim 1, wherein the optical bandpass filter has a bandpass of less than 300 cm$^{-1}$.

5. The system of claim 1, wherein peak detectivity "D*" of the narrowband detector is higher than 1×10$^{10}$.

6. The system of claim 1, further comprising the controller detecting the output of the narrowband detector as the interferometer is scanned and processing interferograms within the bandpass of the optical bandpass filter at two resolutions and using the interferograms processed at a lower resolution as a background for interferograms processed at a higher resolution.

7. The system of claim 6, wherein the controller employs cosine apodization.

8. The system of claim 6, wherein the controller adds a filter spectrum of the optical bandpass filter into a regression analysis.

9. The system of claim 1, further comprising a cooler, wherein the optical bandpass filter is housed within an assembly of the narrowband detector and a temperature of the optical bandpass filter and the narrowband detector are stabilized by the cooler.

10. The system of claim 1, further comprising a preamplifier for amplifying an output of the narrowband detector, wherein the controller the controller tunes the narrowband detector by controlling a gain setting for the preamplifier.

11. The system of claim 1, wherein the controller scans the interferometer by scanning a mirror of the interferometer.

12. The system of claim 1, wherein a center wavelength of a passband of the optical bandpass filter is between 3 and 4 µm.

13. The system of claim 1, further comprising a filter wheel for holding the optical bandpass filter and an air filter, controller switching between the optical bandpass filter and the air filter.

14. A spectrometry method, comprising:
    analyzing a gas sample with a Fourier transform infrared spectrometer;
    obtaining interferograms by detecting the light after passing through the sample gas with a narrowband detector having at least an 8 µm cutoff; and
    filtering light prior to being with the optical bandpass filter having a bandpass of less than 450 cm$^{-1}$.

15. The method of claim 14, wherein the light is detected with a MCT detector.

16. The method of claim 15, wherein the narrowband detector has at least a 5 µm cutoff.

17. The method of claim 15, wherein peak detectivity "D*" of the narrowband detector is higher than 1×10$^{10}$.

18. The method of claim 14, wherein the light is filtered with the optical bandpass filter having a bandpass of less than 300 cm$^{-1}$.

19. The method of claim 14, further comprising detecting an output of the narrowband detector as an interferometer of the Fourier transform infrared spectrometer is scanned and processing interferograms at two resolutions and using the interferograms processed at a lower resolution as a background for interferograms processed at a higher resolution.

20. The method of claim 19, further comprising employing cosine apodization.

21. The method of claim 19, further comprising adding a filter spectrum of the optical bandpass filter into a regression analysis.

* * * * *